United States Patent
Takeshita et al.

(10) Patent No.: US 8,434,767 B2
(45) Date of Patent: May 7, 2013

(54) SEALING UNIT WITH MOUNTING ERROR PREVENTION CONSTRUCTION

(75) Inventors: Yuhei Takeshita, Makinohara (JP); Takeaki Kaneko, Makinohara (JP)

(73) Assignee: Yazaki Corporation, Tokyo (JP)

( * ) Notice: Subject to any disclaimer, the term of this patent is extended or adjusted under 35 U.S.C. 154(b) by 582 days.

(21) Appl. No.: 12/635,992

(22) Filed: Dec. 11, 2009

(65) Prior Publication Data

US 2010/0148453 A1 Jun. 17, 2010

(30) Foreign Application Priority Data

Dec. 12, 2008 (JP) ................................ 2008-317304

(51) Int. Cl.
*F16J 15/02* (2006.01)

(52) U.S. Cl.
USPC .......................................................... 277/630

(58) Field of Classification Search .................. 277/607, 277/608, 609, 616, 630, 637, 644; 285/110, 285/113, 230; 174/135, 137 R, 142, 152 G, 174/152 R, 153 G
See application file for complete search history.

(56) References Cited

U.S. PATENT DOCUMENTS

| | | | |
|---|---|---|---|
| 3,967,837 A | | 7/1976 | Westerlund et al. |
| 4,101,138 A | * | 7/1978 | Gaggiano ..................... 277/598 |
| 4,311,248 A | | 1/1982 | Westerlund et al. |
| 4,366,841 A | | 1/1983 | Currie et al. |
| 5,039,117 A | * | 8/1991 | Gohrlich et al. .............. 277/591 |
| 5,163,721 A | * | 11/1992 | Babuder ........................ 285/328 |
| 5,758,910 A | * | 6/1998 | Barber et al. .................. 285/330 |
| 6,290,240 B1 | * | 9/2001 | Knapp ........................... 277/651 |
| 6,408,890 B1 | * | 6/2002 | Mori ............................. 138/126 |
| 6,454,314 B1 | * | 9/2002 | Grosspietsch et al. ........ 285/319 |
| 7,900,936 B2 | * | 3/2011 | Imai .............................. 277/598 |
| 7,950,700 B2 | * | 5/2011 | Willemstyn et al. .......... 285/364 |
| 2008/0042372 A1 | * | 2/2008 | Roberts et al. ................ 277/593 |
| 2009/0072494 A1 | * | 3/2009 | Smith ............................ 277/625 |
| 2011/0005333 A1 | * | 1/2011 | Ball ............................... 73/861 |

FOREIGN PATENT DOCUMENTS

| | | |
|---|---|---|
| DE | 2549387 A1 | 5/1976 |
| EP | 0945662 A2 | 3/1999 |
| JP | 2003-130226 A | 5/2003 |
| JP | 2006-031961 A | 2/2006 |
| JP | 2007-309492 A | 11/2007 |
| JP | 2008-064199 A | 3/2008 |

OTHER PUBLICATIONS

Office Action dated Apr. 25, 2012 issued by the French Patent Office in counterpart French Application No. 0958592.
Communication from the Japanese Patent Office dated Jan. 31, 2013, in a counterpart application No. 2008-317304.

* cited by examiner

*Primary Examiner* — Vishal Patel
*Assistant Examiner* — Stacy Warren
(74) *Attorney, Agent, or Firm* — Sughrue Mion, PLLC

(57) ABSTRACT

A sealing unit with a mounting error preventing construction, includes a cylindrical member and an annular sealing member mounted in a circumferential groove formed on an outer circumference of the cylindrical member. At least two projections having different sizes are provided on the sealing member asymmetrically with respect to an axis of the sealing member and are projected in a direction in which the axis extends. Cutout portions for receiving the projections are provided on the cylindrical member.

3 Claims, 4 Drawing Sheets

SEALING UNIT WITH MOUNTING ERROR PREVENTION CONSTRUCTION

BACKGROUND

The present invention relates to a sealing unit with a mounting error preventing construction which is realized by mounting an annular sealing member in a circumferential groove formed on an outer circumference of a cylindrical member.

A connector for connecting electric wires or optical fibers together has a watertight and airtight construction realized by sealing a space between two connecting portions by a seal member, so as to prevent the infiltration of water and dust (refer, for example, to Patent Document 1). In general, in a connector having a watertight construction or airtight construction, a connecting portion of a housing which constitutes a seal structure is formed into a cylindrical shape, and of two cylindrical connecting portions which are male and female housings, the male housing is inserted into an inner circumference of the female housing for connection. The sealing member seals a space defined between the inner circumference and an outer circumference of these cylindrical connecting portions.

For example, in a seal structure in which an annular sealing member is provided on a male housing side, a circumferential groove into which the sealing member is to fit is formed on an outer circumference of a cylindrical member of a male housing. The sealing member, which is formed of an elastic material such as rubber, is elastically deformed to be expanded in diameter and is then contracted in diameter to be restored from the expanded condition in a predetermined mounting position so as to be mounted in the circumferential groove.

Incidentally, as is shown in FIG. 7, a sealing member 500 of this type has a plurality of ridge portions (hereinafter, referred to as "lips") 501, 503 which are formed coaxially side by side along a direction which follows an axis G on an outer circumferential surface thereof to enhance the sealing performance. By this configuration, the sealing performance is enhanced by increasing the number of contact locations where the lips 501, 503 are brought into contact with an inner circumferential surface of a cylindrical member of a female housing so as to form something like multiple steps.

FIG. 8 is an enlarged sectional view of a main part taken along a plane which includes an axis of the sealing member.

Of the lips 501, 503, the lip 501 which constitutes a connecting side with at least the female housing is made up of sloping faces which differ in inclination angle between one side and the other side of the lip 501 along the direction which follows the axis G. Namely, a sloping surface 505 having a large inclination angle is disposed on a side which follows the direction in which the sealing member 500 is mounted on the male housing (refer to a direction indicated by a thick white arrow in FIG. 8), and a sloping surface 507 having a small (moderate) inclination angle is disposed on an opposite side to the sloping surface 505. In the male housing in which the sealing member 500 is mounted in the circumferential groove, when the female housing is fitted thereon, a fitting force is reduced at the moderate sloping surface 507 which is disposed on a side from which the female housing is fitted, so as to obtain good fitting properties.

[Patent Document 1] JP-A-2006-31961

In the related sealing member 500, however, the left and right sloping faces 505, 507 of the lip 501 having the angular shape are formed at the different inclination angles so as to reduce the fitting force with which the female housing is fitted on the mating male housing to thereby obtain good fitting properties. However, since the magnitudes of the inclination angles of the sloping faces 505, 507 are difficult to be visually determined, there has been caused a fear that the sealing member is mounted in an opposite mounting direction to the designed mounting direction. There has been concern that the fitting force is increased conversely in the event that the sealing member is erroneously mounted in the opposite direction. In addition, with the sealing member 500 which is formed of the elastic material, there has been a problem that a mounting error is easy to occur in which the sealing member 500 is attempted to be mounted in a turned over condition in which an inner circumferential face 509 and an outer circumferential face 511 are turned inside out.

SUMMARY

The invention has been made in view of the situations described above and an object thereof is to provide a sealing unit with a mounting error preventing construction which restricts the mounting of a sealing member to a cylindrical member in a proper direction, so as to realize the prevention of a sealing member mounting error.

In order to achieve the above object, according to the present invention, there is provided a sealing unit comprising:
   a cylindrical member; and
   an annular sealing member mounted in a circumferential groove formed on an outer circumference of the cylindrical member,
   wherein at least two projections having different sizes are provided on the sealing member asymmetrically with respect to an axis of the sealing member and are projected in an axis direction in which the axis of the sealing member extends; and
   wherein cutout portions for receiving the projections are provided on the cylindrical member.

According to the sealing unit, in the event the sealing member is mounted in the opposite direction when the sealing member is mounted on the cylindrical member, the projections are positioned in the opposite direction to the direction in which the cutout portions receive the projections, and hence, the projections do not coincide with the cutout portions, whereby the mounting error due to the opposite mounting direction is recognized. With the sealing member which is formed of the elastic material such as rubber, at the time of mounting the mounting error is easy to occur in which the sealing member is attempted to be mounted in the turned over condition in which the inner circumferential face and the outer circumferential face of the sealing member are turned inside out. According to this configuration, in the event that the sealing member is mounted in the direction in which the projections project in the turned over condition, the positions of the projections are different from those of the cutout portions, and at least one of the projections is not allowed to fit in the cutout portion, whereby the mounting error due to the turned over condition is recognized.

Preferably, a projecting direction of the projections is same as a direction in which the sealing member is mounted on the cylindrical member.

According to the sealing unit, the operator only has to mount the sealing member in the projecting direction in which the projections project based on the fact that the projecting direction of the projections coincides with the sealing member mounting direction, and hence, the determination capability on the mounting direction is improved in the sealing member mounting work.

Preferably, a lip including a triangle shape in a cross section having the axis is provided on an outer circumferential face of the sealing member. The lip has first sloping face and a second sloping face which is closer to the projections than the first sloping face in the axis direction. A second inclination angle of the second sloping face with respect to the axis direction is greater than the first inclination angle of the first sloping face with respect to the axis direction.

According to the sealing unit, the second sloping face having the large inclination angle is disposed on the side near to the projections, and the first sloping face having the small (moderate) inclination angle is disposed on the opposite side which is far from the projections. A mating cylindrical member (a housing hood of a mating connector) is fitted on the cylindrical member in which the sealing member is mounted in the circumferential groove. As this occurs, the moderate first sloping face is disposed on the side from which the mating cylindrical member is fitted, whereby not only can good fitting properties be obtained, but also the reliable connection can be enhanced by the second sloping face having the large inclination angle functioning to increase friction in a connection releasing (dislocating) direction once the connection is completed.

According to the sealing unit of the invention, at least the two projections having the different sizes are provided on the sealing member asymmetrically with respect to the axis of the sealing member so as to project in the axial direction, and the cutout portions for receiving the projections are provided on the cylindrical member. Therefore, in the event that the sealing member is mounted in the opposite direction or in the turned over condition, the sealing member is not allowed to be mounted in the circumferential groove, whereby the mounting direction of the sealing member is restricted to the one in the proper mounting direction. As a result, the operator can easily recognize the mounting error, thereby making it possible to prevent the sealing member mounting error.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, a preferred embodiment of a sealing member mounting error preventing construction according to the invention will be described by reference to the drawings.

Figure 1:
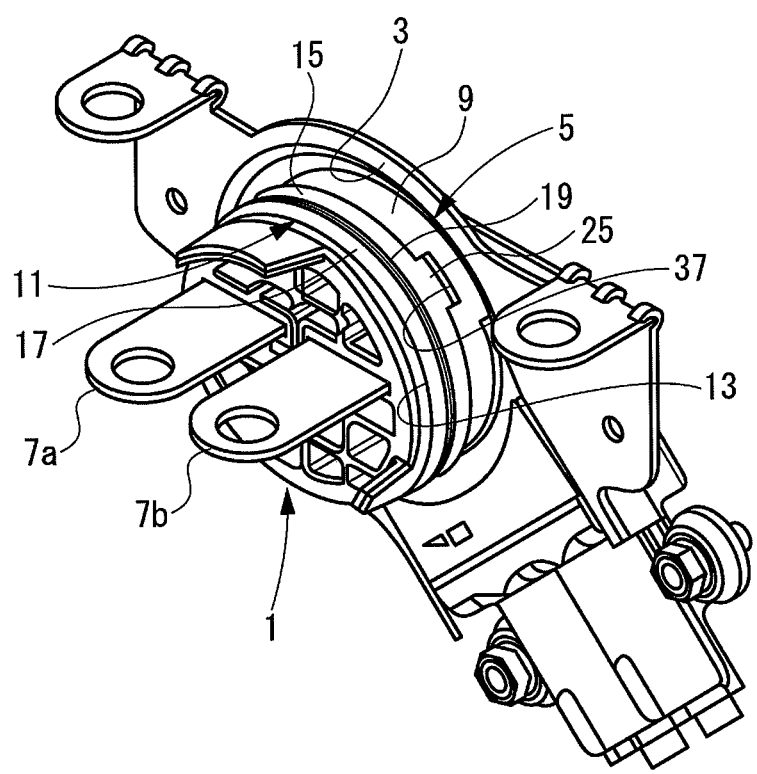
FIG. 1 is a perspective view of a male housing which is provided with a sealing member mounting error preventing construction according to the invention.

FIG. 1 is a perspective view of a male housing which is provided with a sealing member mounting error preventing construction according to the invention.

In this embodiment, a seal structure will be described as being applied to a connector (a connecting portion which is provided integrally on equipment being included) for use in wiring electric wires.

A seal structure is made up of a male housing 1 and a female housing, not shown, which is fitted on the male housing 1. The male housing 1 has a fitting portion 5 which constitutes a cylindrical member provided on an equipment attachment portion 3 so as to project therefrom. A pair of male terminals 7a, 7b are provided inside the fitting portion 5 so as to project for electrical connection with female terminals provided inside the female housing.

A hood, which is a cylindrical member of the female housing, not shown, is fitted on the fitting portion 5. Namely, an outer circumferential face 9 of the fitting portion 5 and an inner circumferential face of the hood constitute seal target faces. A watertight and dustproof construction which interrupts a communication between an exterior portion and a portion lying further inwards than the fitting portion 5 is realized by the hood being fitted on the fitting portion 5 so as to seal a gap defined therebetween, whereby a reliable connection between the terminals is designed to be enhanced.

A circumferential groove 13 (refer to FIGS. 5, 6) is formed on an outer circumference of the fitting portion 5 for an annular sealing member 11 to be mounted therein.

Figure 2:
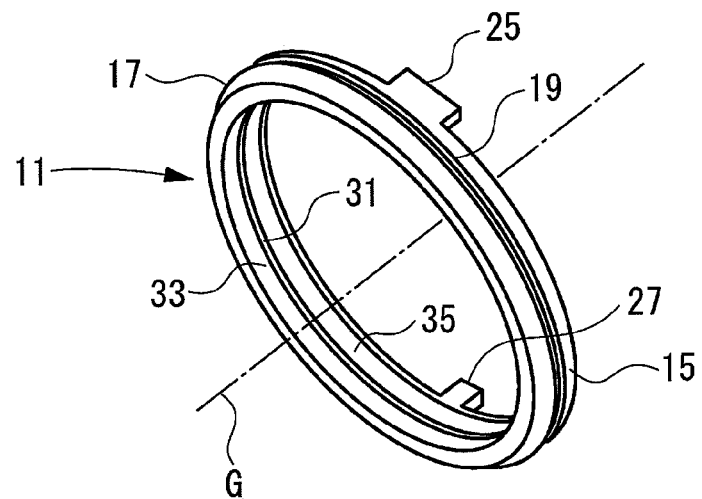
FIG. 2 is a perspective view of the sealing member shown in FIG. 1.
Figure 3:
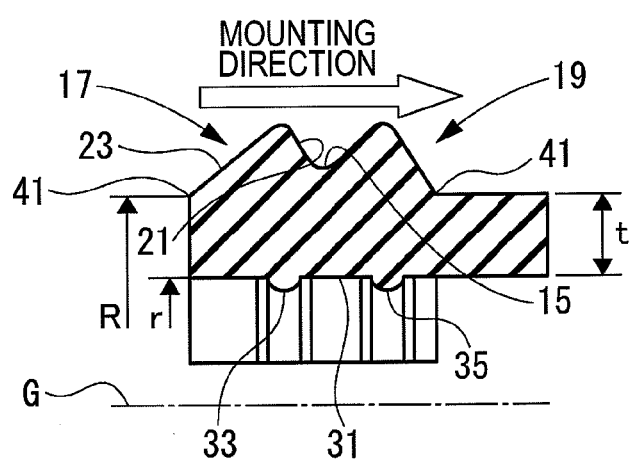
FIG. 3 is an enlarged sectional view of a main part taken along a plane which includes an axis of the sealing member shown in FIG. 2.
Figure 4:
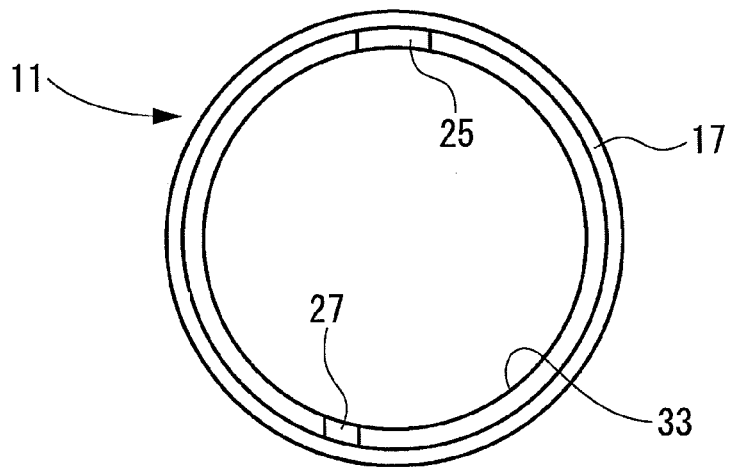
FIG. 4 is a front view of the sealing member shown in FIG. 2 which results when viewed from a side where projections project.

FIG. 2 is a perspective view of the sealing member shown in FIG. 1, FIG. 3 is an enlarged sectional view of a main part taken along a plane which includes an axis of the sealing member shown in FIG. 2, and FIG. 4 is a front view of the sealing member shown in FIG. 2 which results when viewed from a side where projections are provided so as to project therefrom.

The sealing member 11 is formed integrally of an elastic material such as rubber. The sealing member 11 has a plurality of lips 17, 19 which are provided coaxially on an outer circumferential face 15 thereof side by side in a direction which follows the axis G for enhancing a sealing performance of the sealing member 11. By the lips 17, 19 being so provided, the number of contact locations of the lips 17, 19 with the inner circumferential face of the hood of the female housing is increased so as to form a multiple step construction, whereby the sealing performance of the sealing member 11 is enhanced.

Of the lips 17, 19, at least the lip 17 which constitutes a side where the sealing member 11 is connected to the female housing is made up of sloping faces having different inclination angles between one side and the other side in the direction which follows the axis G. Namely, a sloping face 21 having a large inclination angle is disposed on a side which follows the direction in which the sealing member 11 is mounted on the fitting portion 5 (refer to a direction indicated by a thick white arrow in FIG. 3) and a sloping face 23 having a small (moderate) inclination angle is disposed on an opposite side thereto.

The hood of the female housing is fitted on the fitting portion 5 shown in FIG. 1 in which the sealing member 11 is mounted in the circumferential groove 13. As this occurs, the moderate sloping face 23 is disposed on the side from which the hood of the female housing is fitted and hence, good fitting properties can be obtained. Once the hood of the female housing has been fitted on the fitting portion 5, the sloping face 21 having the large inclination angle functions to increase friction in a connection releasing (dislocating) direction, thereby making it possible to enhance the reliable connection.

As is shown in FIG. 4, at least two projections 25, 27 having different sizes are provided on the sealing member 11 asymmetrically with respect to an axis G of the sealing member 11 so as to project in the same direction which follows the axis G (a rightward direction in FIG. 3). When used herein, "asymmetrically with respect to the axis G of the sealing member 11" means an arrangement of the projections 25, 27 shown in FIG. 4 or a positional relationship in which the projection 25 is not superimposed on the projection 27 when the former is rotated through 180 degrees about the axis G. In addition, the "different sizes" means that the projections 25, 27 differ from each other in at least either area or shape. A case is also included in which the projections are the same in area but are different in shape. A case is also, of course, included in which the projections are the same in shape but are different in area.

In this embodiment, the projection 25 constitutes a large quadrangular projection, while the projection 27 constitutes a small quadrangular projection. Hereinafter, the projection 25 will also be referred to as a large projection 25 and the projection 27 will also be referred to as a small projection 27. The large projection 25 and the small projection 27 are curved into an arc with the same curvature as that of an outside diameter of the fitting portion 5.

The sealing member 11 is mounted in the circumferential groove 13 so that foot portions 41 of the lips 17, 19 shown in FIG. 3 coincide substantially with the outer circumferential face of the fitting portion 5. Namely, the lips 17, 19 are caused to project from the outer circumferential face of the fitting portion 5. The large projection 25 and the small projection 27 are formed to have a thickness t having a value which results by subtracting a radius r of an inner circumferential face 31 from a radius R of the foot portion 41 of the sealing member 11.

As is shown in FIG. 3, the large projection 25 and the small projection 27 are caused to project towards the direction in which the sealing member 11 is mounted on the fitting portion 5. Namely, the projecting direction of the large projection 25 and the small projection 27 coincides with the mounting direction of the sealing member 11. The operator only has to mount the sealing member based on the projecting direction of the large projection 25 and the small projection 27, and the determination properties of the mounting direction of the sealing member 11 during the sealing member mounting work is improved.

In this embodiment, while the large projection 25 and the small projection 27 are formed into the quadrangular pieces, the large projection 25 and the small projection 27 may be formed into arrow shapes which imply the mounting direction in order to enhance the determination properties of the mounting direction further. As this occurs, a large cutout 37 and a small cutout 39, which will be described later, are also formed into corresponding arrow shapes so that the arrow-shaped large projection 25 and small projection 27 fit therein, respectively.

A plurality of small lips 33, 35 are provided coaxially on the inner circumferential face 31 of the sealing member 11 side by side in the direction which follows the axis G so as to enhance the sealing performance with the circumferential groove 13. The number of contact locations of the small lips 33, 35 with the circumferential groove 13 is increased so as to form a multiple step construction, whereby the sealing performance of the sealing member 11 is enhanced.

Figure 5:
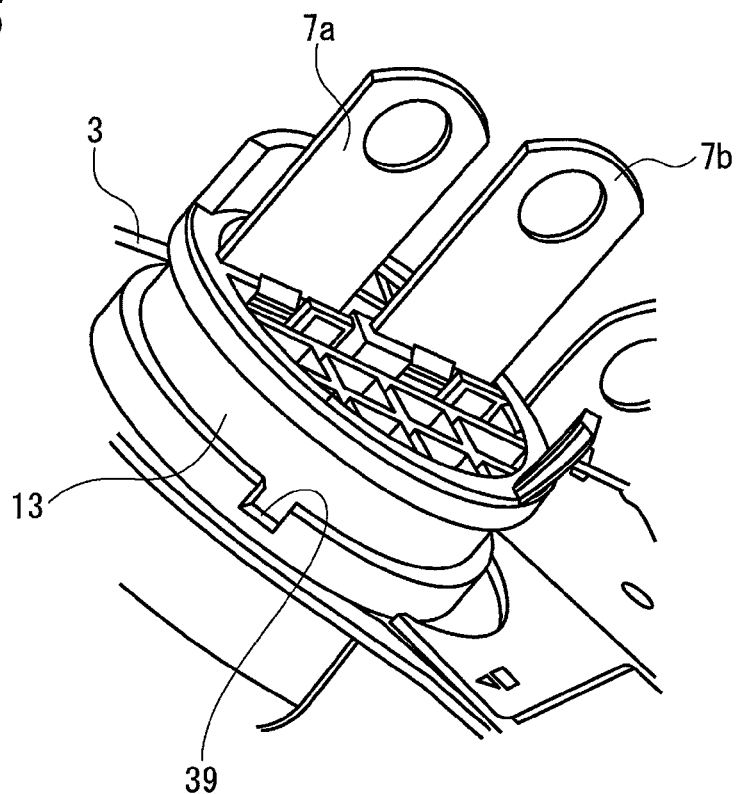
FIG. 5 is a perspective view of a cylindrical member on which a circumferential groove is formed which results when viewed from a side where a small cutout portion is formed.
Figure 6:
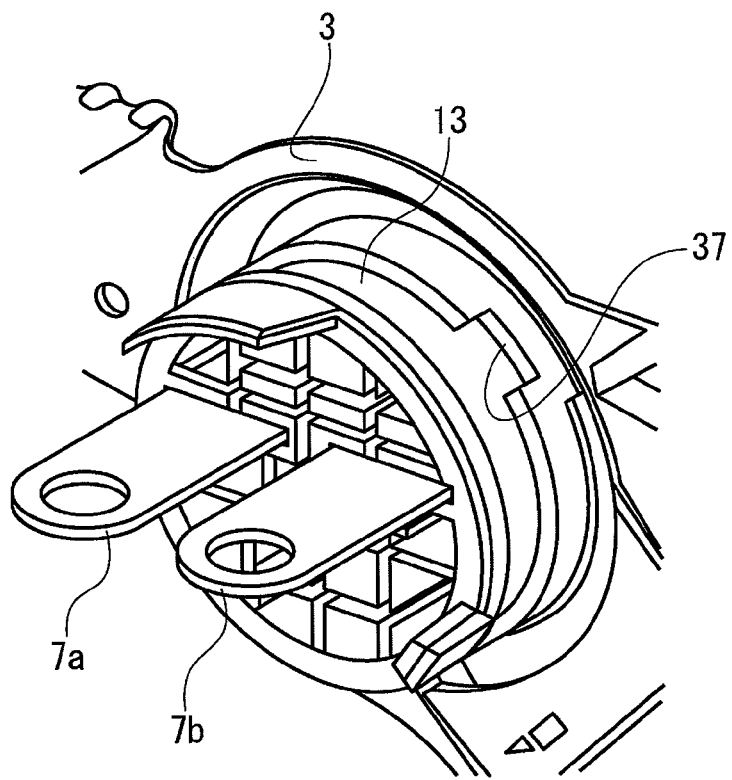
FIG. 6 is a perspective view of the cylindrical member on which the circumferential groove is formed which results when viewed from a side where a large cutout portion is formed.
Figure 7:
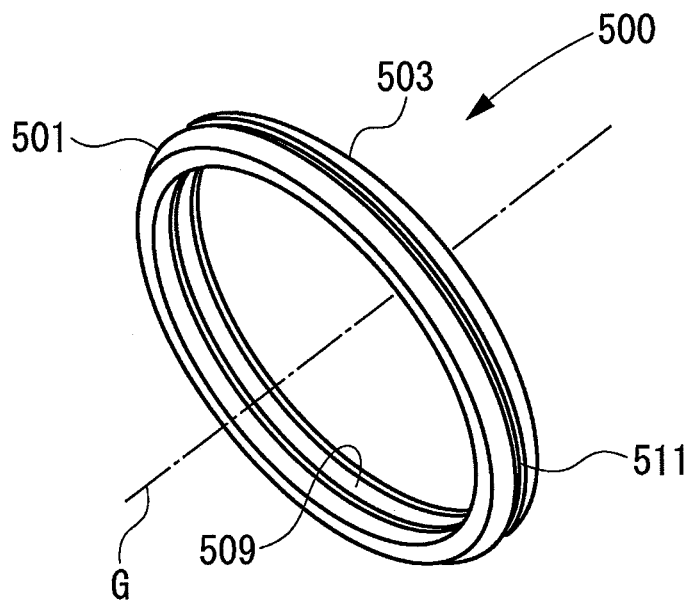
FIG. 7 is a perspective view of a related sealing member.
Figure 8:
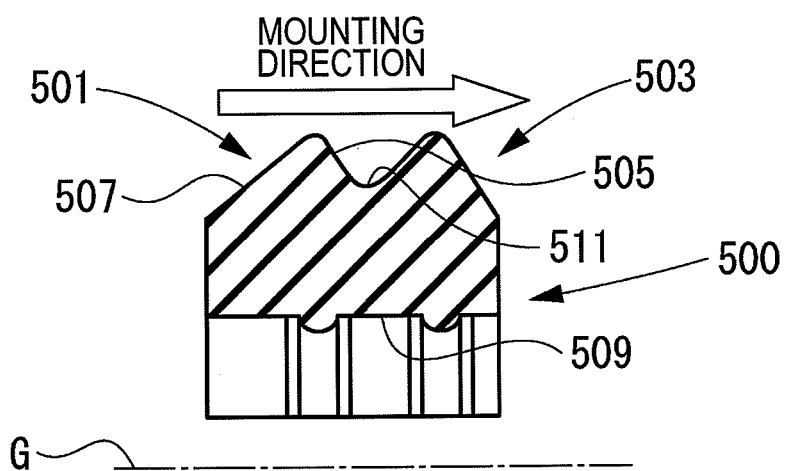
FIG. 8 is an enlarged sectional view of a main part taken along a plane which includes an axis of the related sealing member.

FIG. 5 is a perspective view of the cylindrical member on which the circumferential groove is formed which results when viewed from a side where the small cutout is formed, and FIG. 6 is a perspective view of the cylindrical member on which the circumferential groove is formed which results when viewed from a side where the large cutout is formed.

Formed on the fitting portion 5 are the large cutout 37, shown in FIG. 6, and the small cutout 39, shown in FIG. 5, into which the large projection 25 and the small projection 27 are to fit, respectively, so as to extend from the circumferential groove 13 in the direction which follows the axis G. The large cutout 37 is formed into a quadrangular shape into which the large projection 25 fits, and the small cutout 39 is formed into a quadrangular shape into which the small projection 27 fits. The large cutout 37 and the small cutout 39 are formed to have a depth which is substantially the same as the thickness t of the large projection 25 and the small projection 27. Consequently, when the sealing member 11 is mounted in the proper orientation, only the lips 17, 19 project from the outer circumferential face of the fitting portion 5.

The function of the sealing member 11 mounting error preventing construction that has the configuration described heretofore will be described.

In the mounting work of the sealing member 11 on the fitting portion 5, when the sealing member 11 is mounted on the fitting portion 5 in the opposite direction, the large projection 25 and the small projection 27 are positioned in the opposite direction to the large cutout 37 and the small cutout 39 which extend from the circumferential groove 13. When the sealing member 11 reaches the circumferential groove 13, the projections 25, 27 do not coincide with the cutouts 37, 39, whereby the mounting error due to the opposite mounting direction is recognized.

In addition, with the sealing member 11 which is formed of the elastic material such as rubber, at the time of mounting the mounting error is easy to occur in which the sealing member 11 is attempted to be mounted in a turned over condition in which the inner circumferential face 31 and the outer circumferential face 15 are turned inside out. According to this configuration, in the event that the sealing member 11 is mounted in the direction in which the large projection 25 and the small projection 27 project in the turned over condition, the positions of the large and small projections 25, 27 are reversed to those of the large and small cutouts 37, 39, and at least one (the large projection 25) of the projections is not allowed to fit in the cutout (the small cutout 39), whereby the mounting error due to the turned over condition is recognized. In addition, the other projection (the small projection 27) fits in the cutout (the large cutout 37) with a play, whereby the mounting error can easily be recognized in a visual fashion.

Consequently, according to the sealing member 11 mounting error preventing construction that has been described heretofore, at least the two large projection 25 and small projection 27 having the different sizes are provided on the sealing member 11 asymmetrically with respect to the axis G of the sealing member 11 so as to project in the direction which follow the axis G, and the cutouts 37, 39 into which the respective projections 25, 28 are to fit are provided on the fitting portion 5 so as to extend from the circumferential groove 13. Therefore, in the event that the sealing member 11 is mounted in the opposite direction or in the turned over condition, the sealing member 11 is not allowed to be mounted in the circumferential groove 13, whereby the mounting direction of the sealing member 11 is restricted to the one in the proper mounting direction. As a result, the operator can easily recognize the mounting error, thereby making it possible to prevent the sealing member mounting error in an ensured fashion.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2008-317304 filed on Dec. 12, 2008, the contents of which are incorporated herein for reference.

What is claimed is:

1. A sealing unit comprising:
   a cylindrical member; and
   an annular sealing member having a longitudinal axis and mounted in an annular groove formed on an outer circumferential surface of the cylindrical member,
   wherein only two projections having different sizes are provided on the sealing member asymmetrically with respect to the longitudinal axis of the sealing member and are projected parallel to the longitudinal axis; and
   wherein cutout portions for receiving the projections are provided on the cylindrical member and are respectively differently sized to receive the differently sized projections.

2. The sealing unit according to claim 1, wherein a projecting direction of the projections is the same as a direction in which the sealing member is mounted on the cylindrical member.

3. The sealing unit according to claim 2, wherein a lip including a triangle shape in a cross section having the longitudinal axis is provided on an outer circumferential surface of the sealing member;
   wherein the lip has a first sloping face and a second sloping face which is closer to the projections than the first sloping face along the longitudinal axis; and
   wherein a second inclination angle of the second sloping face with respect to the longitudinal axis is greater than a first inclination angle of the first sloping face with respect to the longitudinal axis.

* * * * *